(12) United States Patent
Lorenz et al.

(10) Patent No.: US 8,811,530 B2
(45) Date of Patent: Aug. 19, 2014

(54) METHOD AND SYSTEM OF BEAMFORMING A BROADBAND SIGNAL THROUGH A MULTIPORT NETWORK

(75) Inventors: Robert Gustav Lorenz, Menlo Park, CA (US); Bertrand M. Hochwald, South Bend, IN (US)

(73) Assignee: Broadcom Corporation, Irvine, CA (US)

( * ) Notice: Subject to any disclaimer, the term of this patent is extended or adjusted under 35 U.S.C. 154(b) by 138 days.

(21) Appl. No.: 13/620,455

(22) Filed: Sep. 14, 2012

(65) Prior Publication Data

US 2013/0017858 A1  Jan. 17, 2013

Related U.S. Application Data

(63) Continuation of application No. 13/023,534, filed on Feb. 8, 2011, now Pat. No. 8,432,997, which is a continuation-in-part of application No. 12/689,058, filed on Jan. 18, 2010.

(60) Provisional application No. 61/302,214, filed on Feb. 8, 2010.

(51) Int. Cl.
*H04K 1/02* (2006.01)
*H04L 25/03* (2006.01)
*H04L 25/49* (2006.01)

(52) U.S. Cl.
USPC ........... 375/296; 375/297; 375/299; 375/346; 375/347; 375/260; 455/562.1; 455/101; 455/272

(58) Field of Classification Search
CPC .............. H04L 27/2647; H04L 5/0007; H04L 27/2657; H04L 27/2662; H04L 5/0048; H04L 27/368; H04L 25/03343; H04L 1/0618; H04L 1/06; H04L 1/0071; H04L 25/0224; H04L 1/20; H03F 1/3247; H03F 1/3294; H03F 2201/3233; H03F 3/24; H03F 1/3241; H04B 7/0669; H04B 1/1027; H04B 1/123; H04B 7/0845; H04B 7/0854; H04B 7/0857

USPC ................ 375/296, 297, 299, 346, 347, 260; 455/562.1, 101, 272

See application file for complete search history.

(56) References Cited

U.S. PATENT DOCUMENTS

| 4,612,548 A | 9/1986 | Beltran |
| 5,412,414 A | 5/1995 | Ast et al. |

(Continued)

FOREIGN PATENT DOCUMENTS

| EP | 1 198 151 A2 | 4/2002 |
| EP | 1 487 140 A1 | 12/2004 |

(Continued)

OTHER PUBLICATIONS

Supplementary European Search Report for European Application No. 11740549.8, mailed Jul. 26, 2013, 6 pages.

(Continued)

*Primary Examiner* — Phuong Phu
(74) *Attorney, Agent, or Firm* — Sterne, Kessler, Goldstein & Fox P.L.L.C.

(57) ABSTRACT

Aspects of a method and system for beamforming a broadband signal through a multipart network are provided. In this regard, a plurality of signals received via a plurality of antennas may be detected and a plurality of transmit signals may be generated, wherein a phase of at least one of the plurality of transmit signals is responsive to at least one of the detected phases of the received signals. Each of the generated plurality of transmit signals may be separately amplified to generate a plurality of amplified signals. A plurality of the amplified signals may be input to a plurality of first ports is of a multiport network, wherein at least one second port of the multiport network may be responsive to signals input to at least two of the plurality of first ports.

20 Claims, 12 Drawing Sheets

(56) References Cited

U.S. PATENT DOCUMENTS

| | | | |
|---|---|---|---|
| 5,530,449 A | 6/1996 | Wachs et al. | |
| 5,581,548 A | 12/1996 | Ugland et al. | |
| 6,320,540 B1 | 11/2001 | Meredith | |
| 6,453,150 B1 | 9/2002 | Yamamoto et al. | |
| 7,154,442 B2 | 12/2006 | van Wonterghem et al. | |
| 7,245,257 B1 | 7/2007 | Bruce et al. | |
| 7,248,216 B2 | 7/2007 | Akiyama et al. | |
| 7,280,515 B2 | 10/2007 | Ranta | |
| 7,286,855 B2 | 10/2007 | Raleigh et al. | |
| 7,308,705 B2 | 12/2007 | Gordy et al. | |
| 7,324,794 B2 | 1/2008 | Chari et al. | |
| 7,450,065 B1 | 11/2008 | Bruce et al. | |
| 7,616,704 B2 | 11/2009 | Li et al. | |
| 8,055,216 B2 | 11/2011 | Dent | |
| 8,428,529 B2 * | 4/2013 | Dakshinamurthy et al. | 455/139 |
| 8,432,997 B2 * | 4/2013 | Lorenz et al. | 375/296 |
| 2003/0179138 A1 | 9/2003 | Chen | |
| 2004/0017326 A1 | 1/2004 | Merrill | |
| 2004/0228422 A1 | 11/2004 | Silveira et al. | |
| 2006/0073802 A1 | 4/2006 | Chari et al. | |
| 2007/0135168 A1 | 6/2007 | Liu | |
| 2007/0173277 A1 | 7/2007 | Yun | |
| 2007/0206686 A1 * | 9/2007 | Vook et al. | 375/260 |
| 2007/0222677 A1 | 9/2007 | Strong | |
| 2008/0153433 A1 | 6/2008 | Pallonen et al. | |
| 2008/0291083 A1 | 11/2008 | Chang | |
| 2009/0005120 A1 | 1/2009 | Ylitalo | |
| 2010/0214017 A1 | 8/2010 | Couchman et al. | |
| 2011/0045787 A1 * | 2/2011 | Jin et al. | 455/114.3 |
| 2011/0176635 A1 | 7/2011 | Hochwald et al. | |
| 2011/0195670 A1 | 8/2011 | Dakshinamurthy et al. | |
| 2011/0201283 A1 | 8/2011 | Lorenz et al. | |
| 2013/0230005 A1 | 9/2013 | Dakshinamurthy et al. | |

FOREIGN PATENT DOCUMENTS

| | | |
|---|---|---|
| EP | 1 775 854 A1 | 4/2007 |
| EP | 2 009 811 A1 | 12/2008 |
| JP | 10-336087 A | 12/1998 |
| WO | WO 2009/078529 A1 | 6/2009 |
| WO | WO 2010/108772 A1 | 9/2010 |
| WO | WO 2011/088452 A1 | 7/2011 |
| WO | WO 2011/097651 A1 | 8/2011 |
| WO | WO 2011/097652 A1 | 8/2011 |

OTHER PUBLICATIONS

European Search Report for European Application No. 12 00 0491, dated Dec. 2, 2013, 5 pages.

International Search Report directed toward International Application No. PCT/US2011/024111, United States Patent and Trademark Office, United States, mailed on May 6, 2011.

Written Opinion directed toward International Application No. PCT/US2011/024111, United States Patent and Trademark Office, United States, mailed on May 6, 2011.

International Preliminary Report directed toward International Application No. PCT/US2011/024111, The International Bureau of WIPO, United States, issued on Aug. 14, 2012.

International Search Report directed toward International Application No. PCT/US2011/021536, United States Patent and Trademark Office, United States, mailed on Apr. 4, 2011.

Written Opinion directed toward International Application No. PCT/US2011/021536, United States Patent and Trademark Office, United States, mailed on Apr. 4, 2011.

International Preliminary Report on Patentability directed toward International Application No. PCT/US2011/021536, The International Bureau of WIPO, Geneva, Switzerland, United States, mailed on Jul. 24, 2012.

International Search Report directed toward International Application No. PCT/US2011/024112, United States Patent and Trademark Office, United States, mailed on Apr. 1, 2011.

Written Opinion directed toward International Application No. PCT/US2011/024112, United States Patent and Trademark Office, United States, mailed on Apr. 1, 2011.

International Preliminary Report on Patentability directed toward International Application No. PCT/US2011/024112, The International Bureau of WIPO, United States, issued on Aug. 14, 2012.

Supplementary European Search Report for European Application No. 11740548.0, mailed Jul. 26, 2013, 3 pages.

Tatu, et al., "Low-Cost Transceiver Architectures for 60 GHz Ultra Wideband WLANs", International Journal of Digital Multimedia Broadcasting, vol. 2009, Article ID 382695, 7 pages.

* cited by examiner

METHOD AND SYSTEM OF BEAMFORMING A BROADBAND SIGNAL THROUGH A MULTIPORT NETWORK

CROSS REFERENCE TO RELATED APPLICATIONS

This patent application is a continuation of U.S. Non-Provisional application Ser. No. 13/023,534, filed Feb. 8, 2011, which is a continuation-in part of U.S. patent application Ser. No. 12/689,058 filed Jan. 18, 2010. U.S. Non-Provisional application Ser. No. 13/023,534 claims benefit from U.S. Provisional Patent Application Ser. No. 61/302,214 filed on Feb. 8, 2010.

Each of the above stated applications is hereby incorporated herein by reference in its entirety.

FIELD OF THE DESCRIBED EMBODIMENTS

The described embodiments relate generally to wireless communications. More particularly, the described embodiments relate to methods and systems for beamforming a broadband signal through a multiport network.

BACKGROUND

Conventional wireless subscriber stations employ radio-frequency (RF) transmitters to produce an output signal that is transmitted to the base station (BS). In mobile wireless networks, one station may be a mobile station (MS), whereas another station may be a BS (BS). As the MS moves throughout the coverage area of the wireless network, the path loss between the MS and the BS changes due to a number of factors including the change in distance between the stations as well as the presence of objects in the environment that serve to obstruct or attenuate the signals traveling from one station to the other.

A critical component in a MS is the power amplifier that is used to transmit the signal to the BS. A power amplifier typically has a maximum output power rating. One method to attain reliable communication with a BS is to ensure that the power amplifier is equipped with sufficient power to overcome the fading and path loss present in a wireless medium.

However, it is not generally feasible to equip an MS with an arbitrarily high-power amplifier for several reasons: (i) there is a limit on the total power that may be consumed by the device; (ii) a high-power amplifier may get excessively warm; (iii) a high-power amplifier may be expensive; (iv) a high-power amplifier may be too large to fit within the size constraints of a small mobile terminal; (v) a high power amplifier may exceed specific absorption rate limits designed to protect safety.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for beamforming a broadband signal through a multiport network, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE PREFERRED EMBODIMENT

In Time Division Duplex Systems, the uplink and downlink wireless channels are reciprocal; this reciprocity can be exploited by transmitting from two or more antennas such that the transmitting signals coherently combine at the BS. Additionally, wireless channels often exhibit substantial imbalances at the MS receive antennas. In an effort to more effectively use the available transmit power of the both power amplifiers, a multiport network is used to provide gains even in the presence of a strong imbalance in the wireless channels.

An embodiment includes a method of transmitting a transmission signal through a plurality of antennas. The method includes generating at least one dynamically adjustable phase shifted signal from the transmission signal. The transmission signal and the at least one dynamically adjustable phase shifted signal are separately amplified. The amplified transmission signal and the amplified at least one dynamically adjustable phase and/or amplitude shifted signal are combined with a multiport network. An output signal at one or more of the plurality of antennas is generated by the multiport network. Also include amplitude scaling. It can be beneficial to scale the amplitudes as well.

Another embodiment includes a transmitter. The transmitter includes a means for generating at least one dynamically adjustable phase shifted signal from a transmission signal. A first amplifier amplifies the transmission signal and a second amplifier amplifies the at least one dynamically adjustable phase shifted signal. A multiport network combines the amplified transmission signal and the amplified at least one dynamically adjustable phase shifted signal, and generates an output signal for each of the plurality of antennas.

Other aspects and advantages of the described embodiments will become apparent from the following detailed description, taken in conjunction with the accompanying drawings, illustrating by way of example the principles of the described embodiments.

Figure 1:
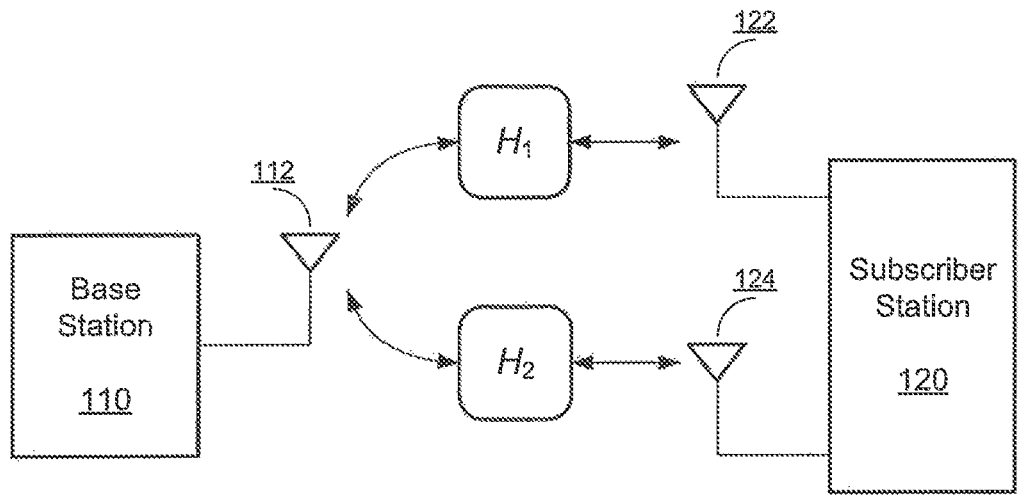
FIG. 1 is a block diagram that shows an exemplary wireless communication system in connection with an embodiment of the invention.

FIG. 1 shows an exemplary wireless communication system, in connection with an embodiment of the invention. Referring to FIG. 1, the communication system may comprise a BS 110 and a subscriber station transceiver 120, wherein multiple propagation channels $H_1$, $H_2$, are formed between each BS antenna 112 and each subscriber station antenna 122, 124. In various embodiments of the invention, the BS 110 may comprise multiple antennas, and the subscriber transceiver 120 may comprise more than two antennas.

A wireless communication signal traveling from the BS 110 to the subscriber station 120 may be referred to as "downlink transmission"; a wireless communication signal traveling from the subscriber station 120 to the BS 110 is referred to as "uplink transmission". The transmissions can be included within a frame that includes a downlink subframe and an uplink subframe.

In addition to the data tones, the BS transmits pilot signals which allow the subscriber station (SS) to estimate the wireless channels to each of its receive antennas. The pilots typically have support across frequency and time in the downlink subframe. Some wireless systems employ a preamble as part of the downlink transmission, e.g., the WiMAX 802.16e system. In the WiMAX system, the preamble, which occurs at the beginning of every downlink subframe, employs pilot tones occurring at every third tone across the frequency spectrum of a multi-carrier signal; additionally, the pilots in the preamble are transmitted at a higher power spectral density and contain modulation known to the receiver (subscriber station) as compared to data carrying subcarriers. These pilots can be used by the subscriber station to accurately estimate the downlink wireless channels. In the 3GPP Long Term Evolution (LTE) system, the downlink signal contains pilots known as cell specific reference signals which can be similarly used to estimate the downlink wireless channel. Additionally, in the LTE system, the subscriber may estimate the Multi-Input Multi-Output (MIMO) wireless channel between the BS and the MS.

Figure 2:
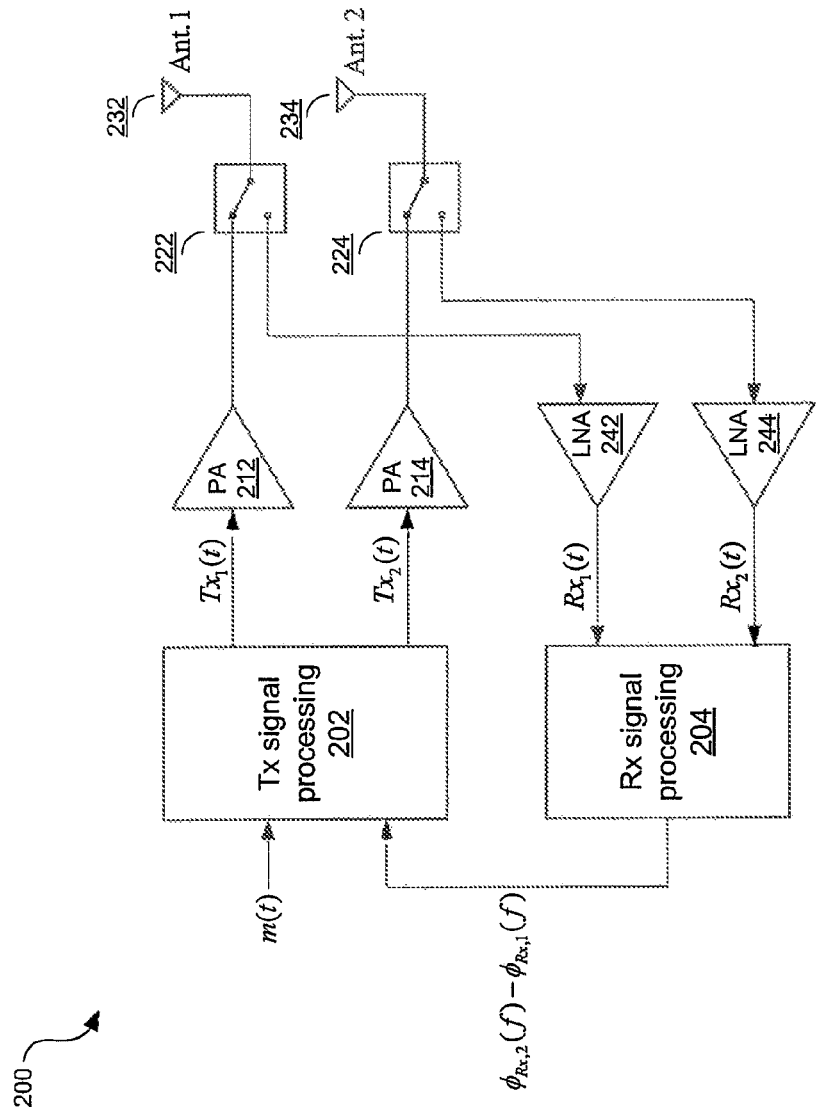
FIG. 2 is a block diagram of illustrating portions of an examplary wireless subscriber transceiver, in accordance with an embodiment of the invention.

FIG. 2 is a block diagram illustrating portions of an exemplary wireless transceiver, in accordance with an embodiment of the invention. Referring to FIG. 2, the exemplary subscriber transceiver 200 comprises Tx signal processing block 202, power amplifiers 212 and 214, low noise amplifiers 242 and 244, switching elements 222 and 224, and antennas 232 and 234. Although FIG. 2 depicts an exemplary case where there are two transmit antennas, and, correspondingly, two power amplifiers, low noise amplifiers, and signals $T_1(t)$ and $T_2(t)$ the invention is not so limited. Aspects of the invention may scale to any number of antennas.

The Tx signal processing block 202 may comprise suitable logic, circuitry, interfaces, and/or code that may be operable to generate a plurality of signals Tx1($t$) and Tx2($t$) from a signal m(t), where the phase and/or amplitude of each of the signals Tx1($t$) and Tx2($t$) may be dynamically adjustable during operation of the transceiver. The amount of phase and/or amplitude adjustment may be dynamically determined during operation based on, for example, real-time, or near-real-time, measurements of signal characteristics. Additionally or alternatively, the amount of phase and/or amplitude adjustments may be based on any other suitable information such as, for example, a predetermined table of values. The signal processing block 202, may operate in the digital domain, analog domain, or both.

Power amplifiers 212 and 214 may comprise suitable logic, circuitry, interfaces, and/or code for amplifying the signals Tx1($t$) and Tx2($t$), respectively. A gain of each of the power amplifiers 212 and 214 may be dynamically adjustable during operation of the wireless transceiver via, for example, one or more control signals from the Tx signal processing block 202.

The low noise amplifiers 242 and 244 may comprise suitable logic, circuitry, interfaces, and/or code for amplifying signals received from antennas 232 and 234 to generate signals Rx1($t$) and Rx2($t$), respectively. A gain of each of the low noise amplifiers 242 and 244 may be dynamically adjustable during operation of the wireless transceiver via, for example, one or more control signals from the Tx signal processing block 202.

In operation, a modulating signal m(t) may be input to the block 202. The block 202 may generate analog signals Tx1($t$) and Tx2($t$) from m(t). The block 202 may dynamically adjust the phase and/or amplitude of each of the signals Tx1($t$) and Tx2($t$). The signals Tx1($t$) and Tx2($t$) may be amplified by power amplifiers 212 and 214 and applied to antennas 232 and 234, respectively, via switches 222 and 224. In an embodiment of the invention, the adjustment of the signals is performed to achieve an array gain at the antenna of the receiver (e.g., antenna 112 of the BS 110 in FIG. 1), as described in more detail the following paragraphs. For the purposes of explaining the invention, we consider the case in which the SS has two antennas, not limited.

Let $$\breve{h}(f, t) = \begin{bmatrix} h_1(f, t) \\ h_2(f, t) \end{bmatrix} \in \mathbb{C}^2$$

denote the vector channel from the BS to antennas 232, and 234. Let $$\breve{x}(t) = \begin{bmatrix} \breve{x}_1(t) \\ \breve{x}_2(t) \end{bmatrix} \in \mathbb{C}^2$$

denote the vector of voltages at the antennas 232 and 234 during reception. Similarly let $$\hat{x}(t) = \begin{bmatrix} \hat{x}_1(t) \\ \hat{x}_2(t) \end{bmatrix} \in \mathbb{C}^2$$

denote the vector of voltages at the antennas during transmission. Let $\phi_{Rx,1}(f, t_{Rx}) = \angle(\breve{x}_1(f, t_{Rx}))$ and $\phi_{Rx,2}(f, t_{Rx}) = \angle(\breve{x}_2(f, t_{Rx}))$ denote the vector valued phases, indexed by frequency, at antennas 232 and 234, respectively, at time $t_{Rx}$. Here, $\angle(\bullet)$:

$\mathbb{C}^N \to [0, 2\pi)^N$ denotes the angle operator, and $t_{Rx}$ corresponds to an interval in the downlink subframe during which the receiver makes phase measurements. Similarly define $\phi_{Tx,1}(f) = \angle(\hat{x}_1(f, t_{Tx}))$ and $\phi_{Tx,2}(f) = \angle(\hat{x}_2(f, t_{Tx}))$ to be the vector valued phases, indexed by frequency, at antennas 232 and 234, respectively, during time interval $t_{Tx}$, the time during which the subscriber transceiver 200 is transmitting.

In an embodiment of the invention, the subscriber transceiver 200 may control the phase relationship of the transmitted signals, during the transmit interval $t_{Tx}$ to satisfy the relationship:

$$\phi_{Tx,2}(f,t_{Tx}) - \phi_{Tx,1}(f,t_{Tx}) = -(\phi_{Rx,2}(f,t_{Rx}) - \phi_{Rx,1}(f,t_{Rx})) \quad (1)$$

That is, at each frequency, the phase difference between ports 1 and 2 during time interval $t_{Tx}$ and may be controlled to be the negative of the phase difference between ports 1 and 2 during time interval $t_{Rx}$. In an embodiment of the invention, the phase difference during transmission may be controlled by multiplying the modulating signal, m(t), by a weighting vector $w(f, t_{Rx})$ to generate adjusted uplink signals $T(t) = w(f, t_{Rx})m(t)$. In an embodiment of the invention, $w(f, t_{Rx})$ may be determined by the Tx signal processing block 202 utilizing eq. 2.

$$w(f, t_{Rx}) = \begin{bmatrix} \frac{\vec{x}_1^*(f, t_{Rx})}{|\vec{x}_1(f, t_{Rx})|} \\ \frac{\vec{x}_2^*(f, t_{Rx})}{|\vec{x}_2(f, t_{Rx})|} \end{bmatrix} = ke^{j\phi} |\vec{h}(t_{Rx})|^{-1} \circ (\vec{h}^*(t_{Rx})) \quad (2)$$

The adjusted uplink signals Tx1(t) and Tx2(t)T$_2$(t) may then be input, respectively, to power amplifiers 212 and 214. The outputs of the power amplifiers may pass through the switches 222 and 224 to the antennas 232 and 234. The outputs of the antennas 232 and 234 may be represented as:

$$\hat{x}(t) = ke^{j\phi} w(f, t_{Rx}) m(t) \quad (3)$$

where k is a real constant related to amplitude scaling, and $\phi$ is a phase shift common to both transmit signals $\hat{x}_1(t)$ and $\hat{x}_2(t)$.

For the same values of time and frequency, the uplink and downlink channels are reciprocal; namely, $\hat{h}(f, t) = \check{h}^T(f, t)$. Let $\hat{h}(f, t_{Tx}) = [\hat{h}_1(f, t_{Tx}) \hat{h}_2(f, t_{Tx})]$ denote the uplink channel during time interval $t_{Tx}$. Then, for $t_{Tx}$ sufficiently close to the receive measurement time $t_{Rx}$, and sufficiently low mobility, $\hat{h}(f, t_{Tx}) \approx \check{h}^T(f; t_{Rx})$. These conditions commonly hold in TDD cellular networks. Ignoring the explicit time dependence and the corresponding technical conditions for simplicity of explanation, the resulting uplink signal received at the BS is given by $$\begin{aligned} s(f) &= \hat{h}(t_{Tx})\hat{x}(t) \quad (4) \\ &= ke^{j\phi} \hat{h}(t_{Tx}) w(t_{Rx}) m(f) \\ &= ke^{j\phi} (|\hat{h}_1| + |\hat{h}_2|) m(f) \end{aligned}$$

If $|\hat{h}_1| = |\hat{h}_2|$, the amplitude of the signal received at the BS is twice that of the value when transmitting from either of the antennas. With proper phasing, the power received by the BS is increased by a factor of 4 with only a doubling of total transmit power. The doubling of power comes form the use of two amplifiers of the same power. The additional factor of two in received power at the BS is referred to as array gain. More generally, the array gain equals the norm of the receive channel vector. The achievable gains are shown in FIG. 3.

Lognormal shadowing and fading commonly creates an imbalance in the receive and transmit channels; substantial imbalances are common. In this case the array gain is diminished. In the limiting case, as one of the channel amplitudes tends to zero, there is no benefit associated with transmitting from the antenna associated the weaker channel. In another embodiment of the invention, however, use of a multiport network may enable realizing array gain even in the limiting case where one of the channel amplitudes tends to zero.

Figure 3:
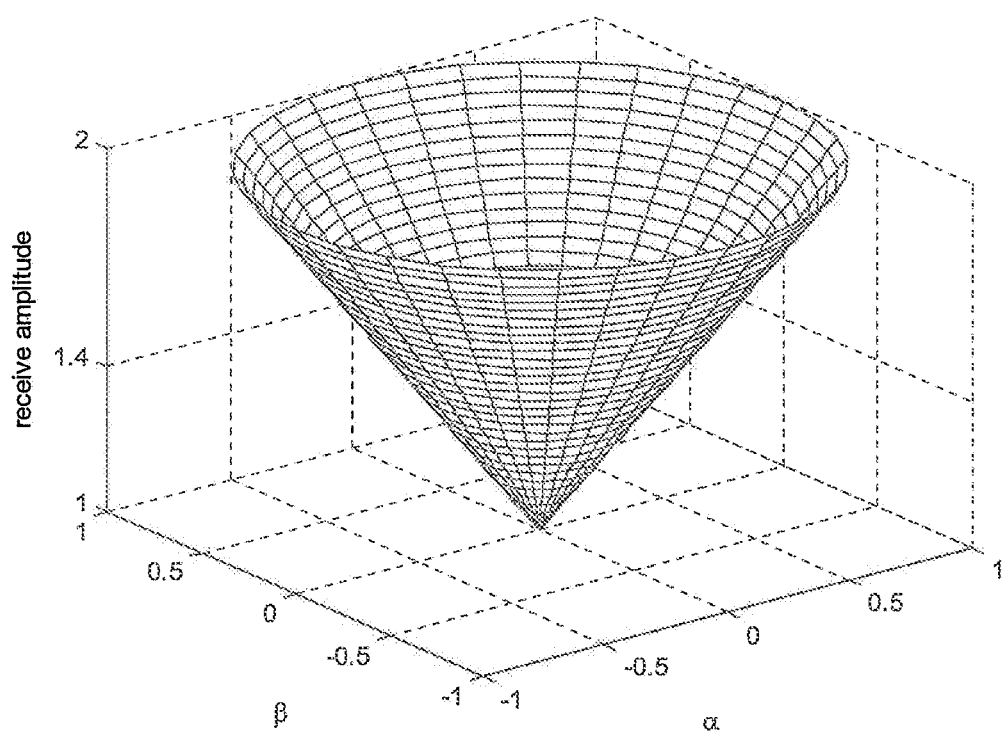
FIG. 3 is a block diagram that shows an example of achievable array gains for phase beamforming with constant power per transmit antenna, in connection with an embodiment of the invention.

FIG. 3 shows an example of achievable array gains for phase beamforming with constant power per transmit antenna, in connection with an embodiment of the invention.

Figure 4:
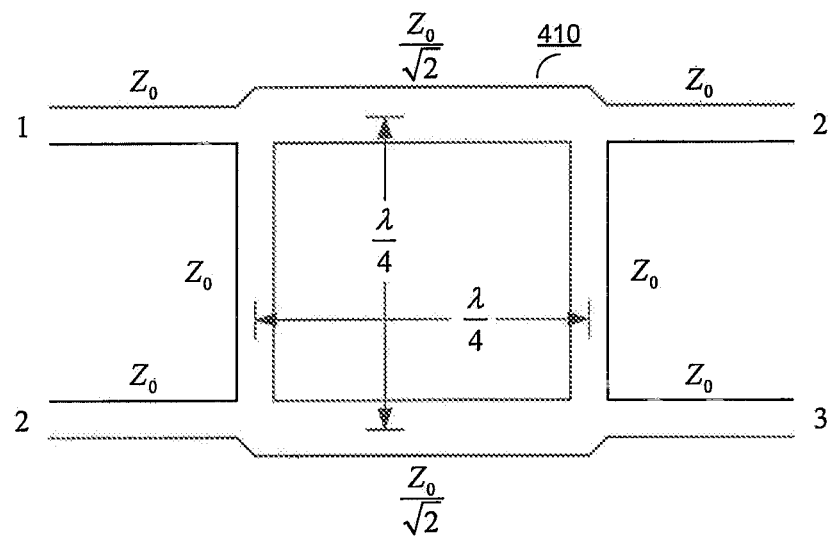
FIG. 4 is a block diagram that shows an example of a multiport network known as a 90 degree quadrature hybrid, in connection with an embodiment of the invention.

FIG. 4 shows an example of an implementation of a multiport network commonly referred to as a 90 degree hybrid coupler, in connection with an embodiment of the invention. For this exemplary embodiment, consider ports 1 and 2 as inputs and ports 3 and 4 as outputs. The 90 degree hybrid coupler 410 may be realized using transmission lines with electrical lengths and characteristic impedances as shown. Here, $Z_0$ denotes a characteristic impedance, typically 50 ohms;

$$\frac{\lambda}{4}$$

is a quarter wavelength line at the transmit center frequency.

The S-parameter matrix for a 2-port network is commonly used to describe the relationship between the reflected, incident power waves according to:

$$\begin{bmatrix} O_1 \\ O_2 \end{bmatrix} = \begin{bmatrix} S_{11} & S_{12} \\ S_{21} & S_{22} \end{bmatrix} \begin{bmatrix} I_1 \\ I_2 \end{bmatrix},$$

where $O_1$ and $O_2$ are the outputs and $I_1$ and $I_2$ are the inputs. Equivalently, $O_1 = S_{11}I_1 + S_{12}I_2$ and $O_2 = S_{21}I_1 + S_{22}I_2$. The transfer function of the multiport network 410 may be represented by a matrix of S-parameters.

The 90 degree hybrid coupler has nominal scattering parameters given by $$[S] = \begin{bmatrix} 0 & j & 1 & 0 \\ j & 0 & 0 & 1 \\ 1 & 0 & 0 & j \\ 0 & 1 & j & 0 \end{bmatrix} \quad (5)$$

Let $$x = \begin{bmatrix} x_1 \\ x_2 \end{bmatrix}$$

be inputs to the hybrid, wherein $x_1$ denotes the signal applied to port 1 and $x_2$, the signal applied to port 2. Similarly, let $$y = \begin{bmatrix} y_1 \\ y_2 \end{bmatrix}$$

be outputs to the hybrid, wherein $y^1$ denotes the signal present at port 3 and $y_2$ the signal present at port 4. Using equation (5), the nominal relationship between the vector of inputs x and the vector of outputs, y, is given by y=Ax where:

$$A = \begin{bmatrix} A_{11} & A_{12} \\ A_{21} & A_{22} \end{bmatrix} = \frac{-1}{\sqrt{2}} \begin{bmatrix} j & 1 \\ 1 & j \end{bmatrix} \quad (6)$$

In practice, 90 degree hybrid couplers exhibit loss and the relationship deviates somewhat from (6). The 90 degree hybrid coupler 410 is a linear, time-invariant, passive, non-ferromagnetic circuit. Assume that the impedances seen by multiport by degree hybrid coupler 410 are nominal. Then, the following voltage relationship also holds:

$$x = A^T y \in \mathbb{C}^2, \quad (7)$$

where $\mathbb{C}$ denotes the field of complex numbers. Hence, under the above assumptions, the 90 degree hybrid coupler is a bidirectional device and the transfer function from one port to another does not depend on which is the input or output.

Figure 5:
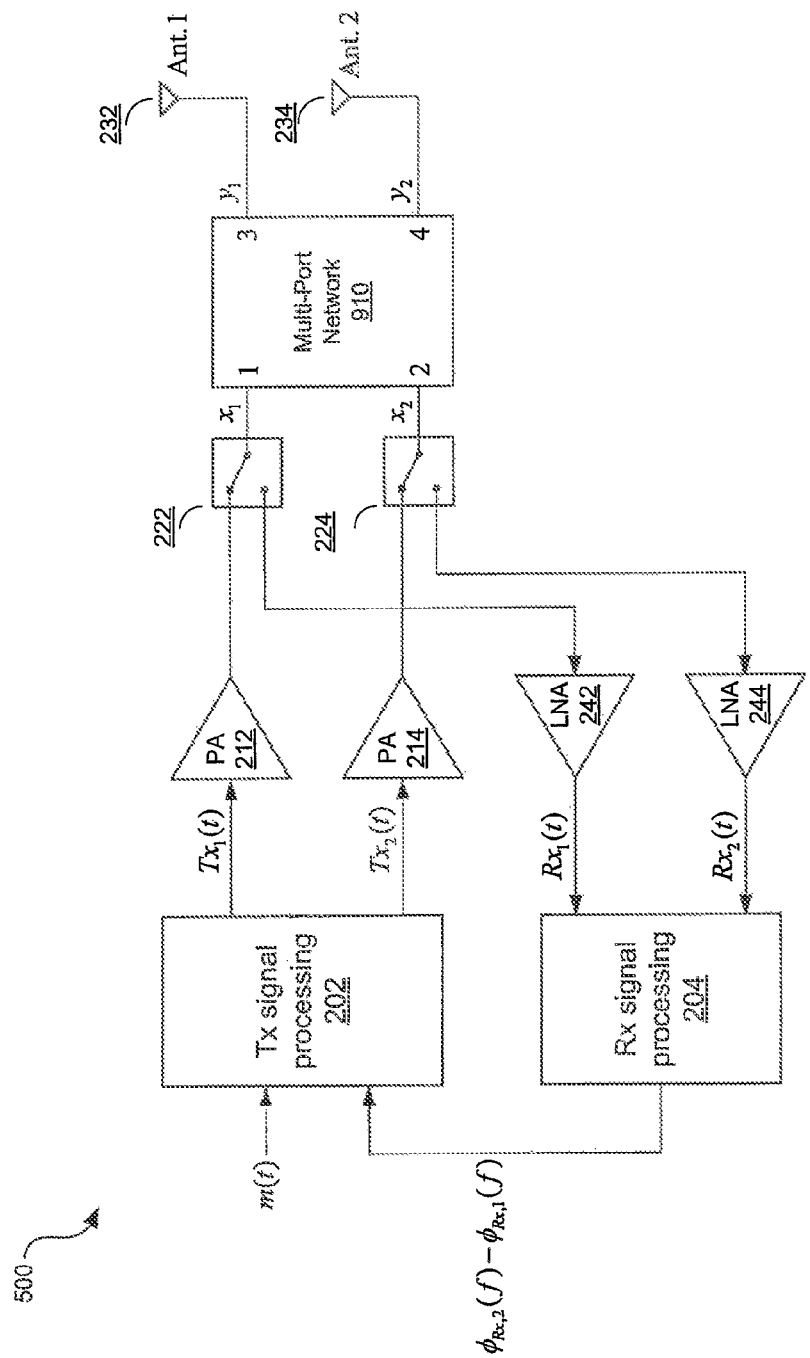
FIG. 5 is a block diagram illustrating portions of an exemplary wireless subscriber transceiver, in accordance with an embodiment of the invention.

FIG. 5 is a block diagram illustrating portions of an exemplary wireless transceiver, in accordance with an embodiment of the invention. Referring to FIG. 5, the exemplary subscriber transceiver 500 comprises a Tx signal processing block 202, Rx signal processing block 204, power amplifiers 212 and 214, low noise amplifiers 242 and 244, switching elements 222 and 224, a multiport network 910, and antennas 232 and 234.

The a Tx signal processing block 202, power amplifiers 212 and 214, low noise amplifiers 242 and 244, switching elements 222 and 224, and antennas 232 and 234 may be as described with respect to FIG. 2. The multi-port network 910 may, for example, be realized in and/or on a semiconductor substrate ("on-chip"), an IC package, and/or printed circuit board. The multiport network may be such that at least one port is responsive at least two other ports. In an embodiment of the invention, the multi-port network 910 may be, for example, the hybrid 410 described in FIG. 4.

The outputs of the power amplifiers 212 and 214 and the inputs of the low noise amplifiers 242 and 244 are coupled to a plurality of first ports, ports 1 and 2, of the multi-port network 910. The antennas 232 and 234 are coupled to a plurality of second ports, ports 3 and 4, of the multi-port network 910. Operation of the transceiver 500 may be similar to operation of the transceiver 200 described with reference to FIG. 2. However, introduction of the multiport network 910 impacts the array gain, as described in more detail in the following paragraphs.

Let $$\check{x}(t) = \begin{bmatrix} \check{x}_1(t) \\ \check{x}_2(t) \end{bmatrix} \in \mathbb{C}^2$$

denote the vector of voltages at ports 1 and 2 of multiport network 910 during reception. Let $$\hat{x}(t) = \begin{bmatrix} \hat{x}_1(t) \\ \hat{x}_2(t) \end{bmatrix} \in \mathbb{C}^2$$

denote a vector of voltages at the ports 1 and 2 during transmission. Similarly, let $$\check{y}(t) = \begin{bmatrix} \check{y}_1(t) \\ \check{y}_2(t) \end{bmatrix} \in \mathbb{C}^2$$

denote a vector of voltages at ports 3 and 4 during reception. Here, port 3 is connected to antenna 232 and port 4 to antenna 234. Let $$\hat{y}(t) = \begin{bmatrix} \hat{y}_1(t) \\ \hat{y}_2(t) \end{bmatrix} \in \mathbb{C}^2$$

denote a vector of voltages at ports 3 and 4 during transmission. Assuming that multiport network 910 is a linear, time invariant, passive, non-ferromagnetic circuit and that the impedances seen by multiport network 910 are nominal, the following voltage relationships hold:

$$\hat{y} = A\hat{x} \in \mathbb{C}^2 \quad (8)$$

and $$\check{x} = A^T \check{y} \in \mathbb{C}^2, \quad (9)$$

where $A \in \mathbb{C}^{2 \times 2}$ is a matrix of scattering parameters. Let $\check{h}(f, t) \in \mathbb{C}^2$ denote the vector channel from the BS to the ports 3 and 4 of multiport network 910. The apparent receive channel after passing through multiport network 910 is given by:

$$\tilde{h}(f,t) = A^T \check{h}(f,t), \quad (10)$$

where $(\bullet)^T$ denotes the transpose. Let $\phi_{Rx,1}(f, t_{Rx}) = \measuredangle(\check{x}_1(f, t_{Rx}))$ and $\phi_{Rx,2}(f, t_{Rx}) = \measuredangle(\check{x}_2(f, t_{Rx}))$ denote the vector valued phases, indexed by frequency, of ports 1 and 2, respectively, at time $t_{Rx}$. Here, $\measuredangle(\bullet): \mathbb{C}^N \to [0, 2\pi)^N$ denotes the angle operator, and $t_{Rx}$ corresponds to an interval in the downlink subframe during which the receiver makes phase measurements. Similarly define $\phi_{Tx,1}(f) = \measuredangle(\hat{x}_1(f, t_{Tx}))$ and $\phi_{Tx,2}(f) = \measuredangle(\hat{x}_2(f, t_{Tx}))$ to be the vector valued phases, indexed by frequency, of ports 3 and 4, respectively, at time $t_{Tx}$, the time during which the subscriber transceiver 500 is transmitting.

In an embodiment of the invention, the subscriber transceiver 500 may control the phase relationship of the transmitted signals, during the transmit interval $t_{Tx}$ to satisfy the relationship: (bob fix)

$$\phi_{Tx,2}(f,t_{Tx}) - \phi_{Tx,1}(f) = -(\phi_{Rx,2}(f) - \phi_{Rx,1}(f)) \quad (11)$$

That is, at each frequency, the phase difference between ports 1 and 2 during time interval $t_{Tx}$ may be controlled to be the negative of the phase difference between port 1 and 2 during time interval $t_{Rx}$. In an embodiment of the invention, the phase difference during transmission may be controlled by applying a weighting factor to the digital modulating signal, m(t), to generate adjusted uplink signals $T(t) = w(f, t_{Rx})m(t)$. In an embodiment of the invention, the weighting vector may be calculated as shown in eq. 12.

$$w(f, t_{Rx}) = \begin{bmatrix} \dfrac{\check{x}_1^*(f, t_{Rx})}{|\check{x}_1(f, t_{Rx})|} \\ \dfrac{\check{x}_2^*(f, t_{Rx})}{|\check{x}_2(f, t_{Rx})|} \end{bmatrix} = \alpha \left| A^T \check{h}(t_{Rx}) \right|^{-1} \circ \overline{(A^T \check{h}(t_{Rx}))} \quad (12)$$

where α is a complex constant related to a common amplitude and phase of the transmit signals into the multiport network 910. The constant α may be chosen to compensate for differences in phase between the transmit and/or receive chains.

The signals Tx1(t) and Tx2(t) are input to power amplifiers 212 and 214 and pass through switches 222 and 224, respectively, resulting in amplified adjusted signals $\hat{x}(t)=\alpha w(f, t_{Rx})m(t)$ being applied to the plurality of first ports of the multiport network 910. The output of the multiport network 910 may be given by:

$$\hat{y}(t) = A\hat{x}(t) \qquad (13)$$

Let $\hat{h}(f, t) = [\hat{h}_1(f, t) \hat{h}_2(f, t)]$ denote the uplink channel. The resulting uplink signal received at the BS is given by $$s(t) = \hat{h}(t)\hat{x}(t) \qquad (14)$$
$$= \alpha\hat{h}(t)Aw(t_{Rx})m(t)$$

Using the previous assumptions about the reciprocity of the uplink and downlink channels, the benefits of this embodiment can be appreciated by considering the case in which $$\check{h}(f, t_{Rx}) = \hat{h}^T(f, t_{Tx}) = \begin{bmatrix} h_1(f) \\ 0 \end{bmatrix};$$

that is, the case in which there is a strong imbalance between the two channels. The effective channel seen by the receiver is given by $$\check{x}(f) = \begin{bmatrix} A_{11} \\ A_{12} \end{bmatrix} h_1(f). \qquad (15)$$

The transmit weight vector is given by $$w = \alpha \frac{h_1^*(f)}{|h_1(f)|} \begin{bmatrix} \frac{A_{11}^*}{|A_{11}|} \\ \frac{A_{12}^*}{|A_{12}|} \end{bmatrix}. \qquad (16)$$

The transmit signal at the output of the multiport network is given by:

$$\hat{y} = Awm(t) \qquad (17)$$
$$= A \begin{bmatrix} \frac{A_{11}^*}{|A_{11}|} \\ \frac{A_{12}^*}{|A_{12}|} \end{bmatrix} \left( \alpha \frac{h_1^*(f)}{|h_1^*(f)|} m(t) \right)$$
$$= \begin{bmatrix} |A_{11}| + |A_{12}| \\ \gamma \end{bmatrix} \left( \alpha \frac{h_1^*(f)}{|h_1^*(f)|} m(t) \right),$$

where m(t) is the modulating signal. The signal received at the BS is given by $$s = \hat{h}\hat{y} \qquad (18)$$
$$= \alpha|h_1|(|A_{11}| + |A_{12}|)m(t).$$

As compared to the case without a multiport network (i.e., FIG. 2), a voltage gain equal to in $|A_{11}|+|A_{12}|$ is realized over transmitting the same power from either or both of the power amplifiers without the hybrid. For the nominal 90 degree hybrid coupler, 310, $|A_{11}|+|A_{12}|=\sqrt{2}$ and the realized gain equals 3 dB.

If the same weight selection policy is employed and $$\check{h}(f, t_{Rx}) = \hat{h}^T(f, t_{Tx}) = \begin{bmatrix} 0 \\ h_1(f) \end{bmatrix},$$

the signal received at the BS, using the same setup, is given by $$s = \hat{h}\hat{y} \qquad (19)$$
$$= \alpha|h_2|(|A_{21}| + |A_{22}|)m(t).$$

In this case, a voltage gain of $|A_{21}|+|A_{22}|$ is realized as compared to transmitting the same power on each antenna without a multiport network. For the nominal 90 degree hybrid coupler, 310, $|A_{21}|+|A_{22}|=\sqrt{2}$ and the realized gain, again, equals 3 dB in the limiting case of a strong imbalance.

The gains of choosing the transmit phase relationship according to (11) are not limited to the case in which a strong imbalance exists between the amplitudes of the received signal. If the amplitudes are the same, array gain may still be realized.

Without loss of generality, consider the case in which a complex signal, with modulus less than or equal to unity, is applied to the first antenna and the second is driven with a unit signal; i.e., where $|\alpha+j\beta|\leq 1$. Then $$x = \frac{1}{\sqrt{2}} \begin{bmatrix} -j & -1 \\ -1 & -j \end{bmatrix} \begin{bmatrix} \alpha+j\beta \\ 1 \end{bmatrix}$$
$$= \frac{1}{\sqrt{2}} \begin{bmatrix} \beta-1-j\alpha \\ -\alpha-j(\beta+1) \end{bmatrix}$$

$$w = \begin{bmatrix} \frac{x_1^*}{|x_1|} \\ \frac{x_2^*}{|x_2|} \end{bmatrix} = \begin{bmatrix} \frac{\beta-1+j\alpha}{\sqrt{\alpha^2+(\beta-1)^2}} \\ \frac{-\alpha+j(\beta+1)}{\sqrt{\alpha^2+(\beta+1)^2}} \end{bmatrix}$$

$$s = Aw$$

$$s = \frac{1}{\sqrt{2}} \begin{bmatrix} -j & -1 \\ -1 & -j \end{bmatrix} \begin{bmatrix} \frac{\beta-1+j\alpha}{\sqrt{\alpha^2+(\beta-1)^2}} \\ \frac{-\alpha+j(\beta+1)}{\sqrt{\alpha^2+(\beta+1)^2}} \end{bmatrix}$$

-continued $$P = \left|\sum h \circ s\right|^2$$
$$= |h^T s|^2$$
$$= \frac{1}{2}\left|[\alpha + j\beta \quad 1]\begin{bmatrix}-j & -1 \\ -1 & -j\end{bmatrix}\begin{bmatrix}\dfrac{\beta-1+j\alpha}{\sqrt{\alpha^2+(\beta-1)^2}} \\ \dfrac{-\alpha+j(\beta-1)}{\sqrt{\alpha^2+(\beta+1)^2}}\end{bmatrix}\right|^2$$
$$= \frac{1}{2}\left|[\beta-1-j\alpha \quad -\alpha-j(\beta+1)]\begin{bmatrix}\dfrac{\beta-1+j\alpha}{\sqrt{\alpha^2+(\beta-1)^2}} \\ \dfrac{-\alpha+j(\beta+1)}{\sqrt{\alpha^2+(\beta+1)^2}}\end{bmatrix}\right|^2$$
$$= \frac{1}{2}\left|\sqrt{\alpha^2+(\beta-1)^2} + \sqrt{\alpha^2+(\beta+1)^2}\right|^2$$

Figure 6:
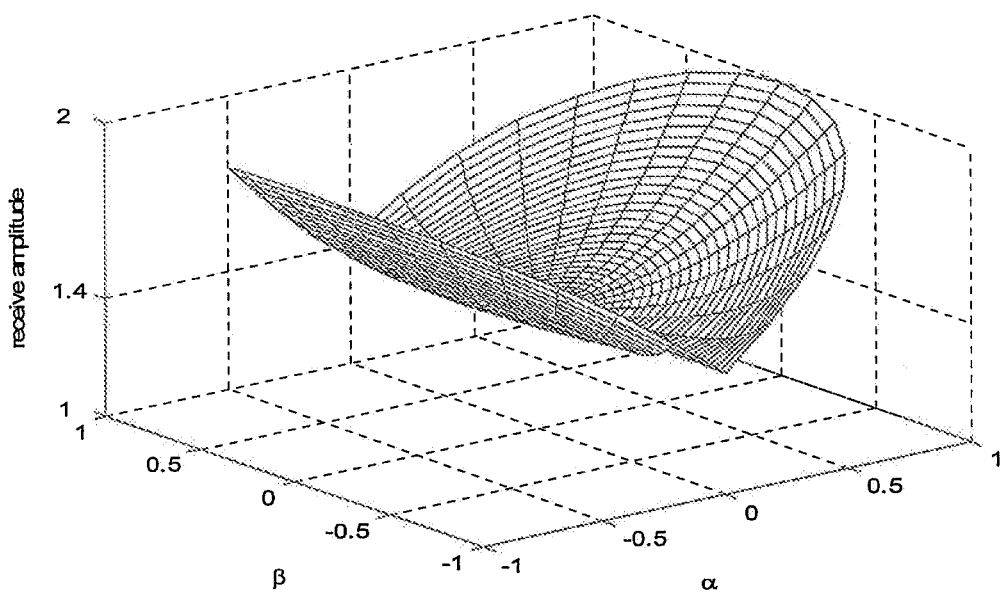
FIG. 6 is a block diagram that shows an example of achievable array gains for phase beamforming using a multiport network, in accordance with an embodiment of the invention.

FIG. 6 shows an example of achievable array gains for phase beamforming with constant power per transmit antenna, in connection with an embodiment of the invention.

Figure 7:
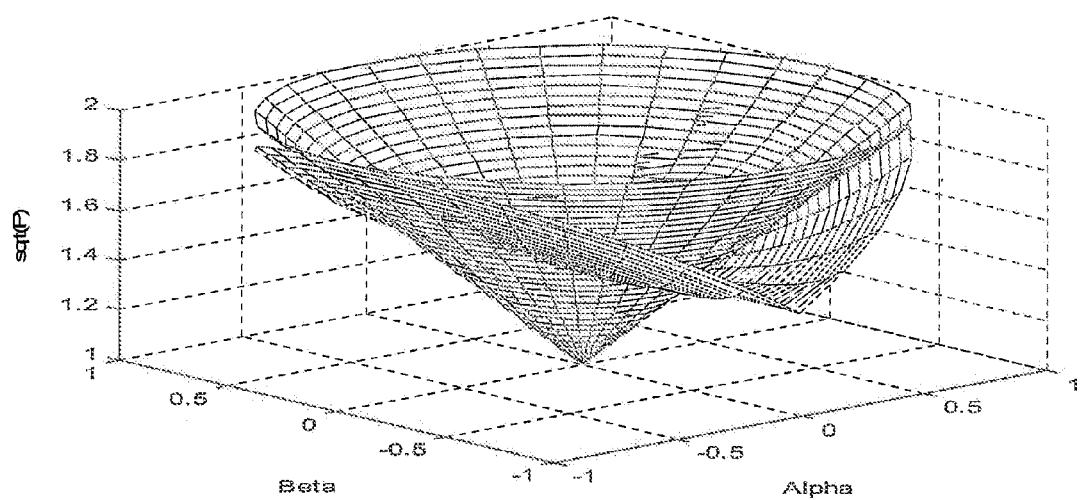
FIG. 7 is a block diagram that compares the achievable array gains for phase beamforming with and without a multiport network, in accordance with an embodiment of the invention.

FIG. 7 shows compares the achievable array gains for equal amplitude, phase beamforming with and without a hybrid coupler as part of the channel. It is observed that equal amplitude, phase beamforming affords a gain of at 3 dB as compared to transmitting from the first antenna, even if the channel to the second antenna is arbitrarily small in value. This is a desirable feature as wireless channels often exhibit strong imbalances.

In another embodiment, a common phase difference between the transmit signals is used for all frequencies, rather than generate a phase vector indexed by frequency; hence, the achievable array gains may be realized even in frequency selective channels.

FIG. 6 shows an example of achievable array gains for phase beamforming using a multipart network, in accordance with an embodiment of the invention.

FIG. 7 compares the achievable array gains for phase beamforming with and without a multiport network, in accordance with an embodiment of the invention.

Figure 8:
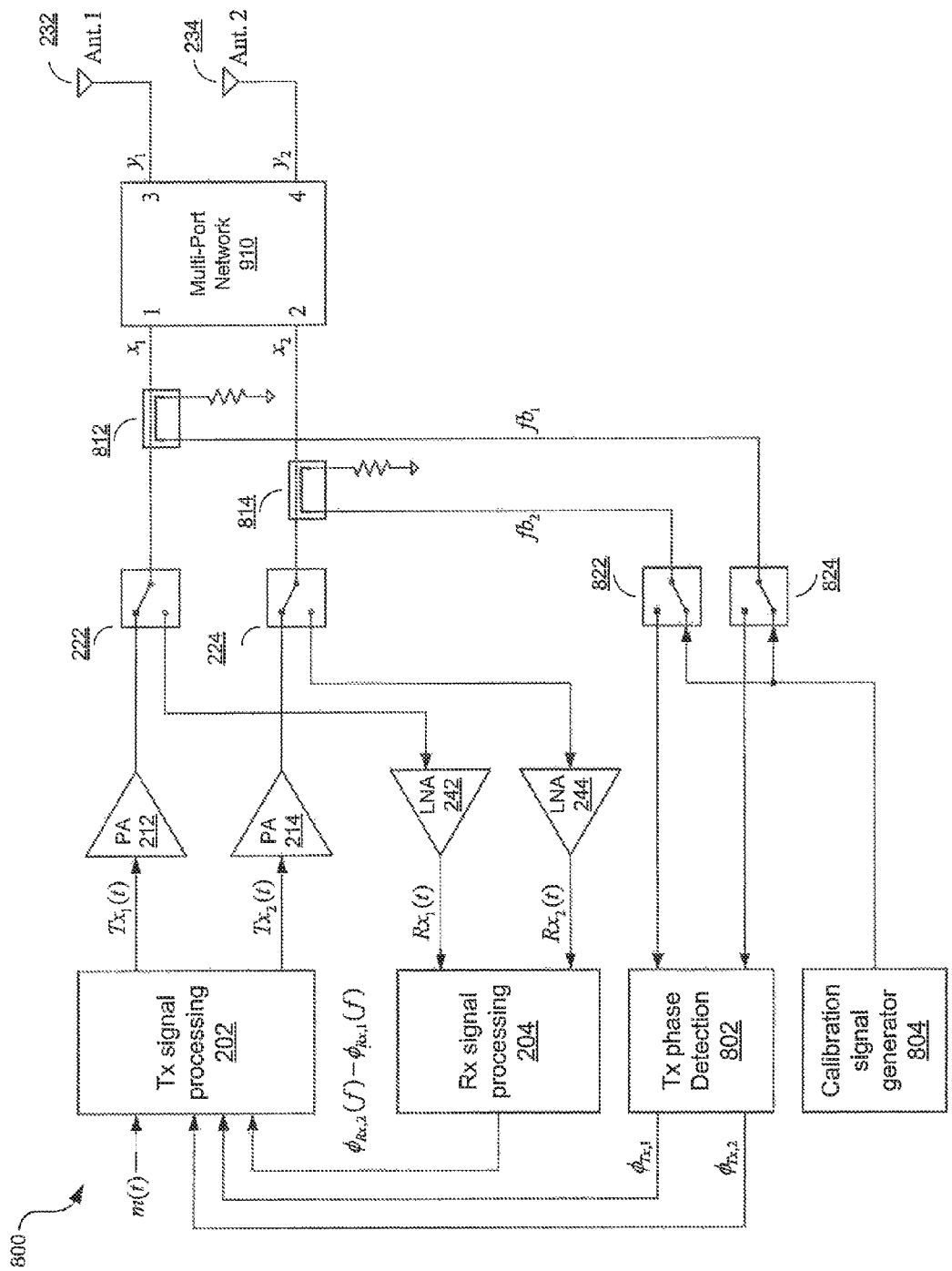
FIG. 8 is a block diagram illustrating portions of an exemplary wireless subscriber transceiver, in accordance with an embodiment of the invention.

FIG. 8 is a block diagram illustrating portions of an exemplary transceiver, in accordance with an embodiment of the invention. Referring to FIG. 7 FIG. 8, the exemplary subscriber transceiver 800 comprises a Tx signal processing block 202, Rx processing block 204, Tx phase detection block 802, calibration signal generator 804, power amplifiers 212 and 214, low noise amplifiers 242 and 244, switching elements 222 and 224, switching elements 822 and 824, directional couplers 812 and 814, and multi-port network 910.

The Tx signal processing block 202, power amplifiers 212 and 214, low noise amplifiers 242 and 244, switching elements 222 and 224, antennas 232 and 234 may be as described with respect to FIG. 2. In an embodiment of the invention, the multi-port network 910 may be, for example, the hybrid 310 described in FIG. 3. The multi-port network 910 may, for example, be realized in and/or on a semiconductor substrate ("on-chip"), an IC package, and/or printed circuit board. Similarly, the directional couplers 812 and 814 may, for example, be realized in and/or on a semiconductor substrate ("on-chip"), an IC package, and/or printed circuit board.

The Tx phase detection block 802 may comprise suitable logic, circuitry, interfaces, and/or code that may be operable to determine a phase difference between the signal at directional coupler 812 and the signal at directional coupler 814.

Commonly, amplitude and phase differences may exist in the transmit RF chains arising from one or more of the following factors: electrical delays, temperature, frequency, and calibration errors. The signals $Fb_1$ and $Fb_2$ are feedback signals which may be subsequently processed by the phase detection block 702 and used to control the amplitude and/or phase of the transmit signals $Tx1(t)$ and $Tx2(t)$. For example, the outputs of low noise amplifiers 242 and 244 may be down-converted, digitized, and processed using digital signal processing techniques to yield phases of the received signals, $\phi_{Rx,1}(f, t_{Rx})$ and $\phi_{Rx,2}(f, t_{Rx})$.

In an embodiment of the invention, the feedback signals may be correlated with the transmit signal m(t). In an embodiment of the invention, the power present in the feedback signals may be measured. In an embodiment of the invention, the feedback signals may have a power level that is approximately 18 dB below the power level of the input to the directional coupler In an embodiment of the invention, calibration signals may be applied to signals $Fb_1$ and $Fb_2$. These calibration signals may couple through directional couplers 812 and 814, and transmit receive switches 222 and 224 to the inputs of low noise amplifiers 242 and 244. These amplified calibration signals may be down-converted and subsequently processed to measure the phase delays of the receive chains from each of the directional couplers 812 and 814 to the respective outputs of the Tx signal processing block 202. These measured phase delays are used to compensate the measured phases of the received signals, $\phi_{Rx,1}(f, t_{Rx})$ and $\phi_{Rx,2}(f, t_{Rx})$.

Figure 9:
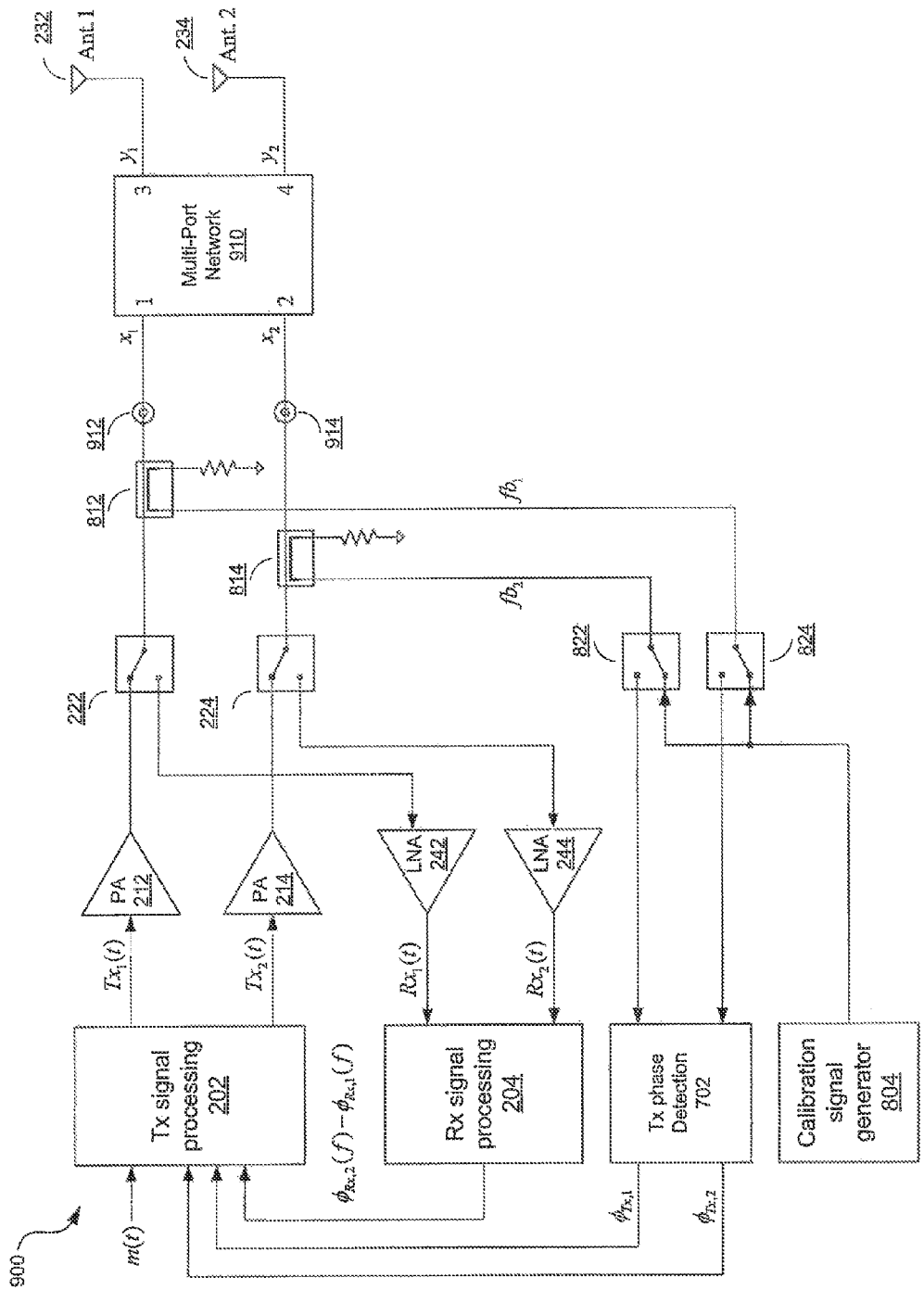
FIG. 9 is a block diagram illustrating portions of an exemplary wireless subscriber transceiver, in accordance with an embodiment of the invention.

FIG. 9 is a block diagram illustrating portions of an exemplary wireless subscriber transceiver, in accordance with an embodiment of the invention. The transceiver 900 may be substantially similar to the portion of the transceiver 800 described with respect to FIG. 8, but may additionally comprise coaxial switches 912 and 914.

In an embodiment of the invention, transmit input signals $Tx1(t)$ and $Tx2(t)$ may be amplified by power amplifiers 212 and 214 and applied to a plurality of first ports of the multiport network 910. A plurality of transmit antennas, 232, 234 are connected to a plurality of second ports of multiport network 910. An embodiment of the multiport network is the 90 degree hybrid coupler 310. The transceiver 900 also comprises coaxial switches which allow the coupler to be bypassed. This may result in large savings in calibration time. Although the coaxial switches 912 and 914 are shown in the signal path between the directional couplers 812 and 814 and the multiport network 910, they could be located in other and/or additional points in the transmit and/or receive chain.

Figure 10:
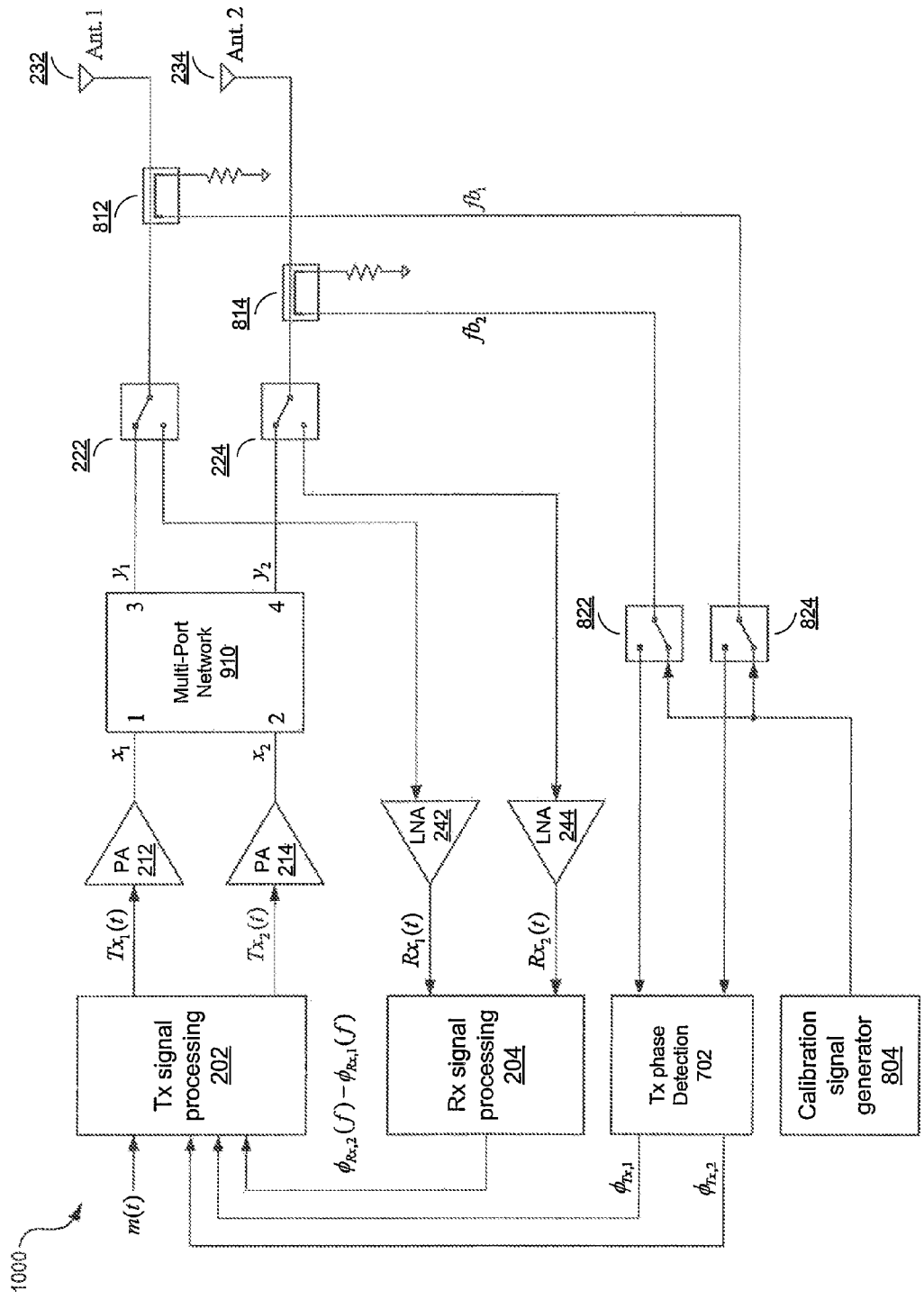
FIG. 10 is a block diagram illustrating portions of an exemplary wireless subscriber transceiver, in accordance with an embodiment of the invention.

FIG. 10 is a block diagram illustrating portions of an exemplary wireless subscriber transceiver, in accordance with an embodiment of the invention. Referring to FIG. 10, the exemplary subscriber transceiver 1000 comprises a plurality of power amplifiers 212 and 214, a multiport network 910, a plurality of antennas 232 and 234, switches 222 and 224, and directional couplers 812 and 814. In the exemplary subscriber transceiver 1000, multiport network 910 is part of the transmit path but not a part of the receive path. Directional couplers 812 and 814 are connected to the antennas 232 and 234. Portions of the transmit signals applied to antennas 232 and 234 are coupled, through directional couplers 812 and 814 to produce feedback signals $Fb_1$ and $Fb_2$, which are subsequently processed to measure the phases of the signals transmitted via each of the antennas 232 and 234. In an embodiment of the invention, the same ports of the directional couplers may be utilized to apply calibration signals to directional couplers 812 and 814 to enable measurement of the phase delays from directional couplers 812 and 814, through the receive chain. Thus, the wireless transceiver 1000 is operable to compensate for phase differences and/or other non-idealities in the transmit chains, phase differences and/or other non-idealities in the receive chains, and characteristics of the multi-port network 910.

Figure 11:
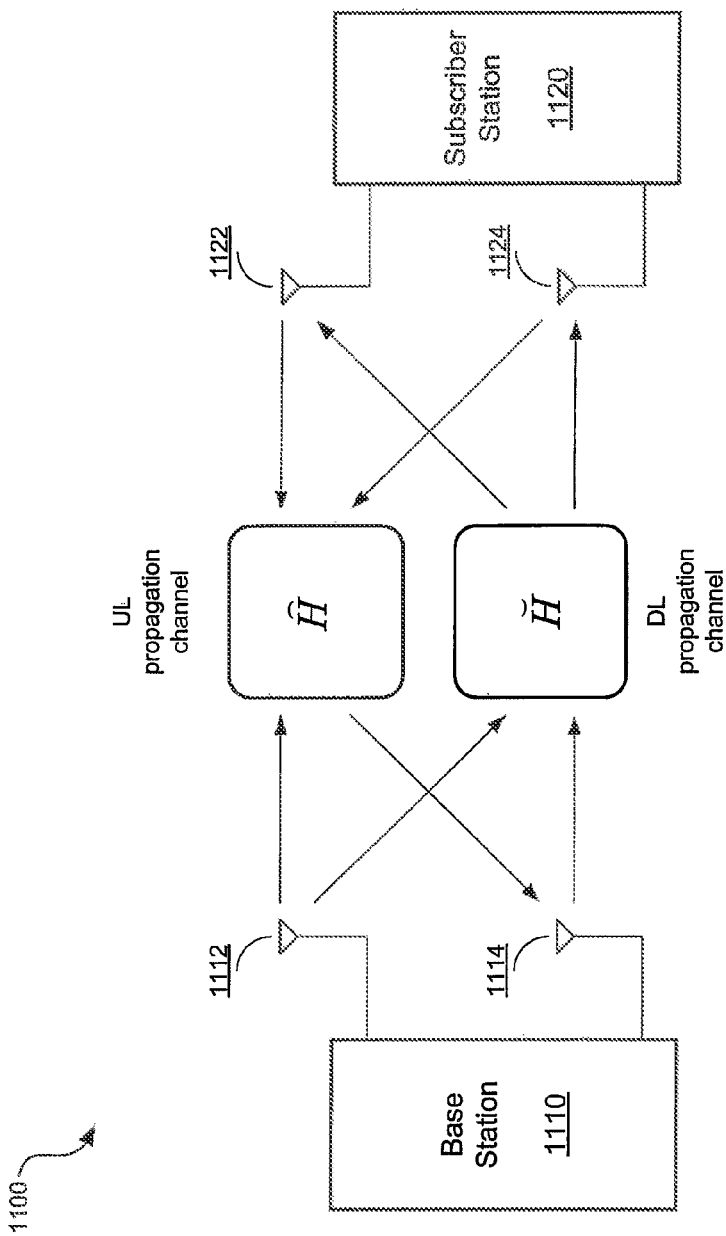
FIG. 11 is a block diagram that shows an exemplary multiple-input-multiple-output (MIMO) communication system, in accordance with an embodiment of the invention.

FIG. 11 shows a block diagram block diagram of an exemplary multiple-input-multiple-output (MIMO) communication system. We will explain the present invention using with two subscriber station antennas; however, the invention is general and applies to larger numbers of subscriber station antennas. In some communication systems, the 3GPP Long Term Evoluton LTE, the Base Stations employ up to 4 transmit antennas. The pilots associated with these four transmit antennas are allocated in such that they do not overlap in both time and frequency. The pilots, in accordance with an embodiment of the invention. The block diagram of a MIMO communication system 1100 is shown. The complex gains associated with the base station (BS) radio frequency (RF) transmit (TX) and receive (RX) chains are denoted $G_{BS,TX} \in \mathbb{C}^{M \times M}$ and $G_{BS,RX} \in \mathbb{C}^{M \times M}$, respectively. Here, M denotes the number of BS antennas. The corresponding complex gains at the subscriber station (SS) are $G_{SS,TX} \in \mathbb{C}^{N \times N}$ and $G_{SS,RX} \in \mathbb{C}^{N \times N}$ where N denotes the number of SS antennas. We will consider only the two antenna SS case only; i.e., N=2.

We now examine the case in which the base station has multiple antennas that are not virtualized. In the LTE system, each of the transmit antennas transmits antenna specific reference signals that are modulated with cell-specific sequences; hence, the subscriber station to learn the full MIMO channel between the BS and SS. Let $\check{H}$ denote the MIMO downlink channel and $\hat{H} = \check{H}^T$ the MIMO uplink channel.

In the case of two subscriber antennas, $\hat{H} \in \mathbb{C}^{M \times 2}$ is the UL propagation channel and $\check{H} \in \mathbb{C}^{2 \times M}$ is the DL propagation channel. Here, M is the number of transmit antennas at the Base station. The received downlink signal is given by $$y_{SS} = \check{H}\check{s} + \eta \in \mathbb{C}^2, \quad (20)$$

where $\check{s}$ is the signal transmitted by the BS, $\eta \in \mathbb{C}^2$ is a vector of additive noises. The received uplink signal is given by $$y_{BS} = \hat{H}\hat{s} + n \in \mathbb{C}^M. \quad (21)$$

In the case of a subscriber station transmitting a single spatial stream in the uplink. We may profitably phase shift to the signal transmitted by a second antenna to maximize the power received at the BS. Assume $s: \|s\|^2 = 1$ and that we apply a phase shift of $e^{j\phi}$ to the second subscriber transmit path in order to maximize the total power received at the BS. This phase shifting corresponds to weighting the transit signal by vector of $w_{UL} \in \mathbb{C}^2$. The power delivered to the BS antenna array is given by:

$$P = \|\hat{H}_{UL} w_{UL}\|^2 \quad (22)$$
$$= w_{UL}^* \hat{H}^* \hat{H} w_{UL}$$
$$= w_{UL}^* R w_{UL}.$$

where $R = \hat{H}^* \hat{H}$ and $(\cdot)^*$ denotes conjugate transpose. It can be shown that an arbitrary phase rotation at the BS receive antenna does not affect the outcome as multiplication by a unitary matrix does not change the $l_2$ a vector. The Gram matrix $\hat{R}$ for the MIMO uplink channel is Hermetian and positive semi-definite; hence, it may be expressed as:

$$\hat{R} = \begin{bmatrix} \alpha & \gamma e^{j\theta} \\ \gamma e^{-j\theta} & \beta \end{bmatrix}, \quad (23)$$

where α, $$\hat{w} = \frac{1}{\sqrt{2}} \begin{bmatrix} 1 \\ e^{j\phi} \end{bmatrix},$$

and γ are non-negative scalars and $\theta \in [0, 2\pi)$. Using (22) and (23), we can express the uplink power delivered to the BS as:

$$P = \hat{w}^* R \hat{w} \quad (24)$$
$$= 0.5 \begin{bmatrix} 1 & e^{-j\phi} \end{bmatrix} \begin{bmatrix} \alpha & \gamma e^{j\theta} \\ \gamma e^{-j\theta} & \beta \end{bmatrix} \begin{bmatrix} 1 \\ e^{j\phi} \end{bmatrix}$$
$$= 0.5(\alpha + \gamma e^{j(\theta+\phi)} + \gamma e^{-j(\theta+\phi)} + \beta)$$
$$= 0.5(\alpha + \beta + 2\gamma \cos(\theta + \phi))$$

The angle which maximizes the received uplink power at BS is given by $\phi = -\theta$. Note that it is not necessary to compute the entire Gram matrix; rather, it suffices to compute the phase of one of the off diagonal entries of it. Hence, in the case of knowledge of the full MIMO channel, the desired phase may be computed according to (24). In the case of knowledge of the full MIMO channel, the desired phase shift φ(f) may be profitably computed on a frequency selective basis, wherein for each frequency, the phase is chosen based upon entries of the Gram matrix formed by the channel estimates. The desired phase shift may be compensated for phase differences between the transmit and/or receive paths. Said phase differences may be determined using calibration techniques employing directional couplers.

In the case wherein multiport network is part of both the transmit and receive signal paths, as depicted in FIG. 8, the multiport network may still be profitably employed. In this case, the multiport network appears as a change of coordinates in the received channel. The desired transmit phase may be calculated according to (24). A subscriber terminal may required to transmit an Alamouti code.

The phase term in (24) should be optimally chosen to maximize the power delivered to the base station array using knowledge of the $\hat{H}_{UL}$. Using (22), we can express P according to $P = \hat{w}^* R \hat{w}$. Using this fact and (24), we write the power delivered to the base station antennas using an EGT weight vector as:

$$\hat{P}_{EGT} = \|\hat{H}_{UL} \hat{w}\|^2 \quad (25)$$
$$= \hat{w}^* R \hat{w}$$
$$= 0.5 \begin{bmatrix} 1 & e^{-j\phi} \end{bmatrix} \begin{bmatrix} \alpha & \gamma e^{j\theta} \\ \gamma e^{-j\theta} & \beta \end{bmatrix} \begin{bmatrix} 1 \\ e^{j\phi} \end{bmatrix}$$
$$= 0.5(\alpha + \gamma e^{j(\theta+\phi)} + \gamma e^{-j(\theta+\phi)} + \beta)$$
$$= 0.5(\alpha + \beta + 2\gamma \cos(\theta + \phi))$$

Here, the first column in (25) identifies the transmitted signals from antennas 1 and 2 at the first unit of time, and the second column identifies the transmitted signals from the two antennas in the second unit of time. In this case, we define two complex weight values that we may apply to the two antennas, which we designate as $w_1$ and $w_2$. For the purpose of explaining the invention, consider the received signal at one of the antennas of the BS. Let $h_1$ and $h_2$ denote the uplink channels from a first and a second subscriber station antenna, respectively. Then, $$y_{BS,1} = h_1 w_1 s_1 + h_2 w_2 s_2 + n_1 \tag{26}$$

represents the signal observed by the BS at the time instance, and $$y_{BS,2} = h_1 w_1 s_2^* - h_2 w_2 s_1^* + n_2 \tag{27}$$

is observed at a second time instance. Equivalently, $$\begin{bmatrix} y_{BS,1} \\ y_{BS,2}^* \end{bmatrix} = \begin{bmatrix} h_1 w_1 & h_2 w_2 \\ h_2^* w_2^* & -h_1^* w_1^* \end{bmatrix} \begin{bmatrix} w_1 s_1 \\ w_2 s_2 \end{bmatrix} + \begin{bmatrix} n_1 \\ n_2 \end{bmatrix} \tag{28}$$

The BS processes these two received signals (representing two units of time) as follows:

$$\frac{1}{\sqrt{|h_1 w_1|^2 + |h_2 w_2|^2}} \begin{bmatrix} h_1^* w_1^* & h_2 w_2 \\ h_2^* w_2^* & -h_1 w_1 \end{bmatrix} \begin{bmatrix} y_{BS,1} \\ y_{BS,2}^* \end{bmatrix} = \tag{29}$$

$$\sqrt{|h_1 w_1|^2 + |h_2 w_2|^2} \begin{bmatrix} s_1 \\ s_2 \end{bmatrix} + n'$$

where n' is and additive noise with the same distribution as n. Thus, the signal-to-noise ratio of the received signals is determined by the quantity:

$$|w_1|^2 |h_1|^2 + |w_2|^2 |h_2|^2 \tag{30}$$

Given the constraint that $|w_1|^2 + |w_2|^2 = 1$, it is clear that the signal-to-noise ratio at the BS is maximized by choosing $w_1 = 1$ if $|h_1| > |h_2|$, and $w_2 = 1$ otherwise. Thus, the terminal sends all the power out of one antenna that has the largest channel amplitude to the BS.

The above argument applies to any receive antenna at the BS. Hence, with multiple receive antennas at the BS, the signal-to-noise maximizing strategy for the subscriber is to use the transmit antenna that maximizes the total received power at the BS. This requires the terminal to know the column norms of the matrix $\hat{H}$.

Figure 12:
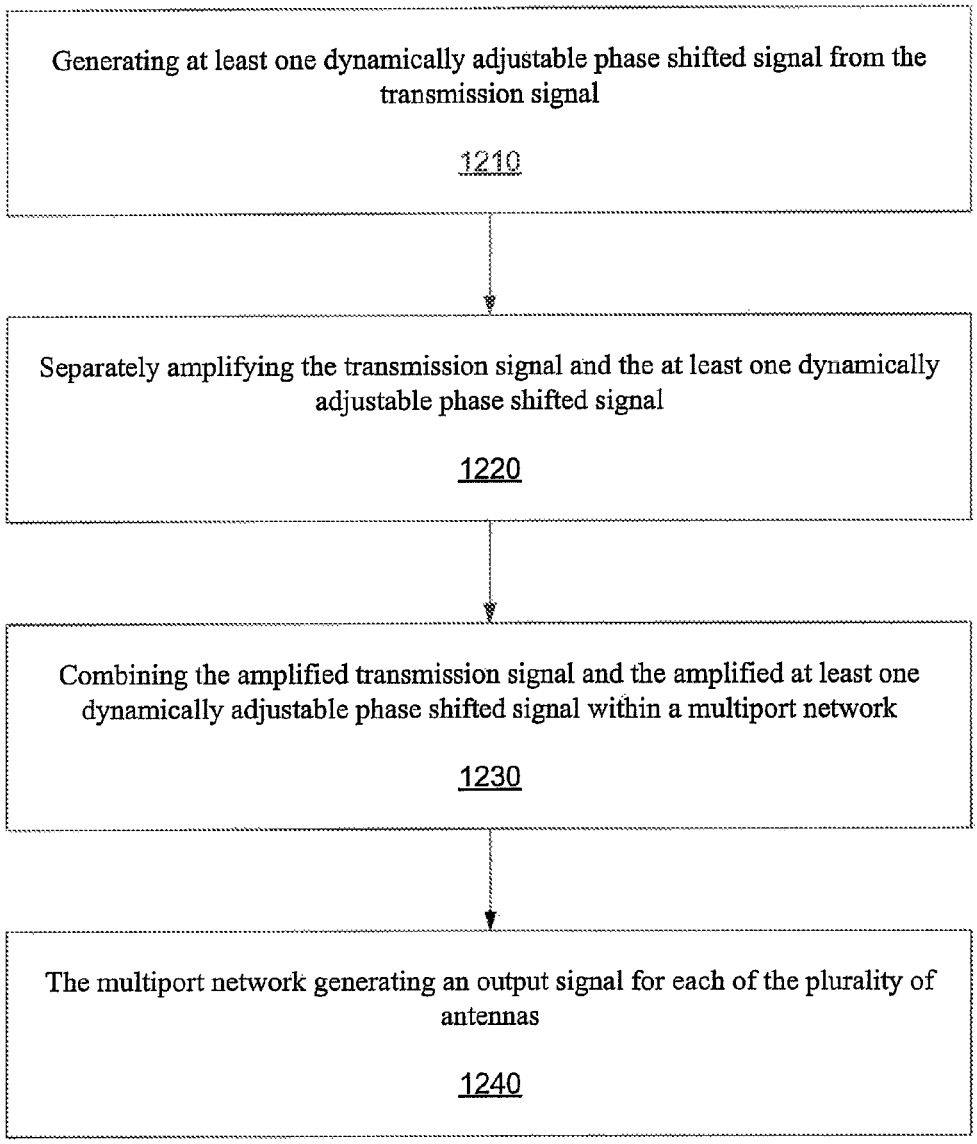
FIG. 12 is a flow chart illustrating exemplary steps for operating a wireless subscriber transceiver, in accordance with an embodiment of the invention.

FIG. 12 is a flow chart illustrating exemplary steps for operating a wireless subscriber transceiver, in accordance with an embodiment of the invention. Referring to FIG. 9, the exemplary steps begin with step 1210 in which, during a reception time interval $t_{Rx}$, the phase detection block 802 may determine a phase difference between the received signal at the coupler 812 and the received signal at the coupler 814. This determination may compensate for a phase difference introduced as a result of non-idealities in the two RF receive chains of the transceiver 800. The phase detection block 802 may output an indication of the determined phase difference to the Tx signal processing block 202.

In step 1220, during transmission time interval $t_{Tx}$, signals Tx1(t) and Tx2(t) may be generated from modulating signal m(t) utilizing the phase determination generated in step 1210. Generation of the signals Tx1(t) and Tx2(t) may comprise adjusting a phase and/or amplitude of one or both of the signals Tx1(t) and Tx2(t) based on the phase determination made in step 1210. In step 1230, the signals Tx1(t) and Tx2(t) may be separately amplified by PAs 212 and 214. In step 1240, the output of each of the amplifiers may be input to one of a plurality of first ports of the multi-port network 910. Each of the resulting signals at the plurality of second ports of the multi-port network may be conveyed to one of the plurality of antennas 232 and 234 for transmission.

Embodiments include preprocessing transmit input signals to establish phase relationships between the amplified signals received by the multiport network 910. This phase relationship may be chosen to produce an improved Signal-to-Noise Ratio (SNR) at the base station (BS) that the transceiver (for example, a subscriber) is communicating with. In a Time Division Duplex (TDD) system, the SNR at the base station (BS) can be predicted from the received downlink signal; that is, from the signal received at the subscriber transceiver when receiving the transmitted signal from the BS.

In an embodiment of the invention, the phase relationships of the signals Tx1(t) and Tx2(t) may be profitably selected on a frequency selective basis. For example, in an OFDM (Orthogonal Frequency Division Multiplexing) system including a plurality of subcarriers, the phase of the signals TX1(t) and Tx2(t) may be adjusted on a subcarrier-by-subcarrier basis. As another example, a common phase relationship of the signals Tx1(t) and Tx2(t) may be used for all subcarriers. Additionally or alternatively, the phase relationships can be adjusted dynamically.

In an embodiment of the invention, the selection of the phase relationships in combination with the multiport network 910, essentially results in a selection of one of the transmit antennas (Ant. 1 through Ant. M) in which the majority of the transmission signal power is directed. The number of antennas is not limited, and the subset of antennas in which the signal power is directed is not limited to one. The antenna selection can be adaptively made over both subcarriers and time (symbols) of multicarrier signals. The number of antennas is not limited. The antenna selection can be adaptively made over both frequency (subcarriers) and time (symbols) of multicarrier signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for beamforming a broadband signal through a multiport network.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   detecting a received phase difference between two of a plurality of signals received via a plurality of antennas;
   generating a plurality of transmit signals, wherein a transmitted phase difference between two of the plurality of transmit signals is set based on the received phase difference;
   separately amplifying each of the generated plurality of transmit signals to generate a plurality of amplified signals; and
   transmitting the plurality of amplified signals via the plurality of antennas.

2. The method according to claim 1, wherein the generating a plurality of transmit signals includes setting the transmitted phase difference to be a negative of the received phase difference.

3. The method according to claim 2, wherein the received phase difference is detected over a first time interval, the transmitted phase difference is set over a second time interval, and the first time interval and the second time interval are proximate to one another in time.

4. The method according to claim 2, wherein the setting the transmitted phase difference includes using weighting functions.

5. The method according to claim 1, wherein the transmitting the plurality of amplified signals includes forwarding the plurality of amplified signals through a multi-port network prior to the plurality of antennas.

6. The method according to claim 5, wherein the detecting a received phase difference between two of a plurality of signals received via a plurality of antennas includes receiving the plurality of signals via the multi-port network.

7. The method according to claim 1, further comprising:
   determining at least one of a phase and an amplitude of one of the plurality of amplified signals by measuring a corresponding signal from a directional coupler in communication with a respective one of the plurality of antennas.

8. The method according to claim 1, wherein the detecting a received phase difference further includes:
   using one or more calibration signals applied to two directional couplers, introduced into signal paths associated with the two received signals.

9. The method according to claim 1, wherein the generating a plurality of transmit signals is further generated based on producing a desired array gain at a remote communications system configured to receive the plurality of transmit signals.

10. The method according to claim 1, wherein the generating a plurality of transmit signals is further generated based on producing a desired signal-to-noise ratio (SNR) at a remote communications system configured to receive the plurality of transmit signals.

11. A system, comprising:
    one or more circuits and/or processors for use in a communication device, the one or more circuits and/or processors being configured to:
    detect a received phase difference between two of a plurality of signals received via a plurality of antennas;
    generate a plurality of transmit signals, wherein a transmitted phase difference between two of the plurality of transmit signals is determined based on the received phase difference;
    separately amplify each of the generated plurality of transmit signals to generate a plurality of amplified signals; and
    transmit the plurality of amplified signals via the plurality of antennas.

12. The system according to claim 11, wherein the transmitted phase difference is set to be a negative of the received phase difference.

13. The system according to claim 12, wherein the received phase difference is detected over a first time interval, the transmitted phase difference is set over a second time interval, and the first time interval and the second time interval are proximate to one another in time.

14. The system according to claim 12, wherein the one or more circuits and/or processors are further configured to set the transmitted phase difference using weighting functions.

15. The system according to claim 11, further comprising:
    a multi-port network coupled to the plurality of antennas through which the plurality of amplified signals are forwarded to the plurality of antennas.

16. The system according to claim 15, wherein the received plurality of signals pass through the multi-port network.

17. The system according to claim 11, wherein the one or more circuits and/or processors are further configured to:
    determine at least one of a phase and an amplitude of one of the plurality of amplified signals by measuring a corresponding signal from a directional coupler in communication with a respective one of the plurality of antennas.

18. The system according to claim 11, wherein the one or more circuits and/or processors are further configured to:
    detect the received phase difference by using one or more calibration signals applied to two directional couplers introduced into signal paths associated with the two received signals.

19. The system according to claim 11, wherein the one or more circuits and/or processors are further configured to:
    generate the plurality of transmit signals to provide a desired array gain at a remote communications system that is configured to receive the plurality of transmit signals.

20. The system according to claim 11, wherein the one or more circuits and/or processors are further configured to:
    generate a plurality of transmit signals to provide a desired signal-to-noise ratio (SNR) at a remote communications system configured to receive the plurality of transmit signals.

* * * * *